United States Patent [19]

Petersen

[11] Patent Number: 4,496,894
[45] Date of Patent: Jan. 29, 1985

[54] ARRANGEMENT FOR CONTROLLABLY DRIVING AN A.C. MOTOR

[75] Inventor: Tom K. Petersen, Nordborg, Denmark

[73] Assignee: Danfoss A/S, Nordborg, Denmark

[21] Appl. No.: 590,507

[22] Filed: Mar. 16, 1984

[30] Foreign Application Priority Data

Apr. 11, 1983 [DE] Fed. Rep. of Germany ....... 3312897

[51] Int. Cl.³ .............................................. H02P 3/22
[52] U.S. Cl. ..................................... 318/759; 318/762
[58] Field of Search ............... 318/759, 757, 760, 762, 318/370, 375, 376

[56] References Cited

U.S. PATENT DOCUMENTS

| 4,039,914 | 8/1977 | Steigerwald et al. | 318/375 |
| 4,051,418 | 9/1977 | O'Berto et al. | 318/759 |
| 4,431,956 | 2/1984 | Ängquist | 318/759 |

Primary Examiner—David Smith, Jr.
Attorney, Agent, or Firm—Wayne B. Easton

[57] ABSTRACT

The invention relates to a circuit for controllably driving an A.C. motor which includes a voltage supply with a pulse modulation regulator followed by an intermediate smoothing circuit and an inverse rectifier. Each phase of the inverse rectifier has two controllable load switching elements in series between two supply lines with each element being bridged by a recovery diode. The voltage of the intermediate circuit is adjustable by a desired value generator and the frequency of the inverse rectifier is adapted to follow the existing value of the voltage of the intermediate circuit. At least one phase of the inverse rectifier is associated with a braking circuit having a brake resistor between one phase connection and a brake connection which is disposed between two series connected brake switching elements disposed between the supply lines. Mounting blocks each with a load switching element and a recovery diode are mounted on a common mounting surface with connections which are disposed on the side opposite to the mounting surface and are directly interconnected by supply line rails and phase connection rails. The two brake switching elements are likewise arranged in a block which is mounted on the mounting surface with connections to the supply line rails and to a phase connection rail.

7 Claims, 5 Drawing Figures

ARRANGEMENT FOR CONTROLLABLY DRIVING AN A.C. MOTOR

The invention relates to an arrangement for controllably driving an A.C. motor, comprising a regulatable D.C. voltage supply which has a D.C. regulator working with pulse modulation followed by an intermediate smoothing circuit, and comprising an inverse rectifier having for each phase two controllable load switching elements which are in series between two supply lines fed from the intermediate circuit, are each bridged by a recovery diode, and have between each other a phase connection for a motor conductor, the voltage of the intermediate circuit being adjustable by a desired value generator and the frequency of the inverse rectifier being adapted to follow the existing value of the voltage of the intermediate circuit.

In a known arrangement of this kind (DE-PS No. 23 61 924), the D.C. voltage regulator is fed from three-phase mains by way of a three-phase rectifier followed by a smoothing condenser. The desired voltage of the intermediate circuit is set with the aid of a desired value generator. A frequency generator in the form of a voltage controlled oscillator for the inverse rectifier is controlled directly by the existing voltage of the intermediate circuit or a value proportional thereto. In contrast with such arrangements in which the inverse rectifier frequency does not follow the existing voltage of the intermediate circuit, no excessive voltages can occur in the intermediate circuit and in the inverse rectifier because the motor will always produce an adequate counter-EMF. However, upon changes in the operating conditions, especially when adjusting the desired value, one must accept a certain transition period before a new stable operating condition is reached.

A driving arrangement is also known (DE-OS No. 31 36 694), in which the inverse rectifier arrangement is fed by a constant D.C. voltage, for example by way of a bridge rectifier fed by a catenary. Upon braking the motor, the latter works as a generator so that the power is fed back into the mains. This can create considerable excess voltages within the inverse rectifier. To avoid this, the load switching elements of one phase are each in parallel with the series circuit of a brake switching element and a brake resistor. When the brake switching elements are brought to the conductive state, the power in the brake resistors are converted to heat. The brake switching elements can during this time continuously receive a control signal or be phase angle controlled. They can also be extinguished during commutation of an associated load switching element.

The invention is based on the problem of providing an arrangement of the aforementioned kind with which the transition period can be reduced with simple means upon an alteration in the operating conditions.

This problem is solved according to the invention in that at least one phase is associated with a braking circuit having a brake resistor between one phase connection and a brake connection which is disposed between two series connected brake switching elements disposed between the supply lines.

When in this arrangement the desired value of the intermediate circuit voltage is set to a lower value, the D.C. voltage regulator will, as hitherto, go over to blocked operation in which the intermediate circuit is separated from the mains. The intermediate circuit voltage will, however, now be adapted rather quickly to the new desired value because for the motor working in the manner of a generator there is now made available by way of the brake resistor an operating circuit in which power is destroyed that could hitherto only be converted to the comparatively low electric and mechanical losses of the motor. The brake resistor does not affect the better transition behaviour upon setting a higher desired value for the intermediate circuit voltage.

The arrangement also has a very simple construction because two brake switching elements need be associated with only one brake resistor. This has a good effect not only on the costs but also on the space requirement and the amount of wiring because such a brake resistor is expensive and cannot be arranged directly adjacent to a switching element. Further, the two brake switching elements may be accommodated in a common block or module.

In a preferred embodiment, it is provided that blocks each with a load switching element and a recovery diode are mounted on a common mounting surface with main connections which are disposed on the side opposite to the mounting surface and are directly interconnected by supply line rails and phase connection rails, and that the two brake switching elements are likewise arranged in a block which is mounted on the mounting surface and of which one main connection is directly connected to the one supply line rail and the second main connection is directly connected to the other supply line rail, whereas the third main connection is connected to the one phase connection rail by way of the brake resistor. In such a construction, practically all connections can be made by using rails that are already available. It is merely necessary to lay two lines leading to the brake resistor beyond the rails.

It is also advantageous if each brake switching element is so allocated in a controllable manner to the load switching element of the associated phase connected to the respective other supply line that, upon response of a brake signal generator, both switching elements become conductive substantially simultaneously. This has the advantage that a current path is established by way of the brake resistor between the two supply lines and electric energy of the intermediate circuit is converted to heat.

In particular, a control signal generator determining the frequency of the inverse rectifier may derive the control signals for the brake switching elements from the control programme for the associated load switching element but deliver same at a slightly retarded instant of ignition. This ensures that in every case a current which flows a little longer because of any self-inductance of the brake resistor or of the associated circuit will have decayed before the respective other brake switching element is brought to the conductive state.

Further, the control signal for the brake switching element may be a trigger signal which is maintained for the entire desired period of the conductive state. This is of particular advantage when the load switching elements are extinguished more than once in each half wave, for example in a control with wide pulses.

The extinguishing circuit can also be of simple design. It need only comprise extinguishing switching elements for individual extinction of the load switching elements but not of the brake switching elements. This is because during extinction of a load switching element a condition is obtained in the inverse rectifier circuit that automatically leads to extinguishing of the associated brake switching element.

In addition, a brake signal generator is advisable which responds when the D.C. voltage regulator switches from pulse modulation operation to blocking operation. This switching over will always occur when the existing voltage of the intermediate circuit is too high for the desired operating condition. By switching the brake resistor on, the existing voltage of the intermediate circuit and the frequency of the inverse rectifier are then lowered. It is in this case immaterial for what reason the existing voltage of the intermediate circuit is regarded to be too high. It could be because the desired value generator was set to a smaller value or because an overcurrent or overvoltage signal switched the D.C. voltage regulator over.

Preferred example of the invention will now be described in more detail with reference to the drawing, wherein.

Figure 1:
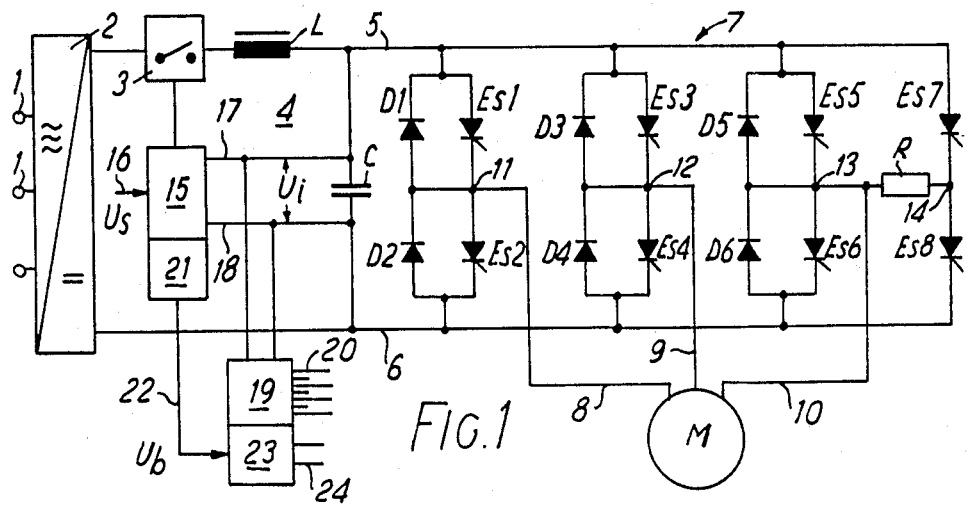
FIG. 1 is a diagrammatic circuit diagram of an arrangement according to the invention.

FIG. 1 illustrates a three-phase D.C. rectifier bridge 2 which is fed by an A.C. current mains 1 and which feeds by way of a D.C. voltage regulator 3 an intermediate smoothing circuit 4 having a longitudinal choke L and a transverse condenser C. The intermediate circuit 4 comprises a positive supply line 5 and a negative supply line 6, which feed an inverse rectifier 7.

The inverse rectifier 7 feeds a three-phase motor M. The motor lines 8, 9 and 10 each lead to a phase connection 11, 12 and 13, respectively. The phase connection 11 is disposed between two series connected controllable load switching elements Es1 and Es2 which are disposed between the supply lines 5 and 6 and can for example be in the form of a thyristor. The phase connection 12 is disposed between the load switching elements Es3 and Es4 and the phase connection 13 between the load switching elements Es5 and Es6. All load switching elements are bridged by a counter-poled recovery diode D1 to D6.

Between the supply lines 5 and 6 there is also the series circuit of two brake switching elements Es7 and Es8 between which there is a brake connection 14. Between this brake connection 14 and the one phase connection 13 there is a brake resistor R. The brake switching elements can likewise be thyristors.

Figure 5:
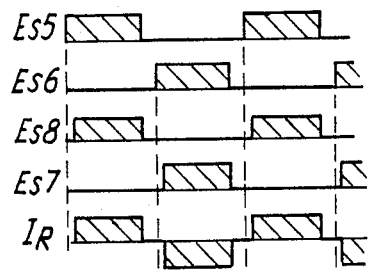
FIG. 5 is a time diagram showing the conditions in various components.

The D.C. voltage regulator 3 comprises a semi-conductor switching element working as a vibrator which is controlled by a voltage control circuit 15 in the sense of pulse modulation. The circuit 15 is fed by way of an input 16 with a desired voltage $U_s$ and, by way of the lines 17 and 18, the existing voltage $U_i$ of the intermediate circuit 4. The existing voltage $U_i$ also controls a frequency generator 19 which, in the correct time sequence, delivers the control signals for the load switching elements Es1 to Es6 at its outlets 20. Connected to the voltage control circuit there is a brake signal generator 21 which delivers a brake signal $U_b$ by way of the line 22 to a brake control circuit 23 when the voltage control circuit 15 has switched the D.C. voltage regulator 3 to the blocking operation. The control signals for the time-wise correct control of the brake switching elements Es7 and Es8 are available at the outlets 24 of the brake control circuit 23. They can be so derived directly from the programme control of the frequency control circuit 19 that a brake switching element is always linked in the correct controlling manner to a load switching element diagonally associated therewith. This is shown in the uppermost four lines of FIG. 5 where the respective conductive state is illustrated for the switching elements Es5 to Es8. It will be seen that the brake switching element Es7 is conductive at the same time as the load switching element Es6 but has a slightly retarded ignition instant. The same applies for the operation of the brake switching element Es8 in relation to the load switching element Es5. By reason of switching on the brake switching elements Es7 and Es8 at alternate sides, the brake current $I_R$ shown in the fifth line of FIG. 5 flows in the brake resistor R.

When the motor M is in stable operation and the desired value $U_s$ is set to a lower value, the voltage control circuit 15 switches the D.C. voltage regulator 3 to blocking operation so that the connection between the rectifier bridge 2 and intermediate circuit 4 is interrupted. Simultaneously, a brake signal $U_b$ is produced so that control signal to the brake switching elements Es7 and Es8 are delivered at the outlets 24 of the brake control circuit 23. During the brake operation, the motor M continues to be operated by the inverse rectifier 7 which is not, however, fed with any further electric power. The existing voltage $U_i$ of the intermediate circuit, which continues to determine the motor speed, is given by the charge on the condenser C. This charge can only still be brought about with the aid of energy fed back by the motor M by way of the recovery diodes D1 to D6. However, since the supply lines 5 and 6 are interconnected by a respective load switching element Es1 to Es6, a brake switching element Es7, Es8 and the brake resistor R, the condenser C can discharge gradually through the brake resistor. After a very short transition period, the existing voltage $U_i$ has decayed to the set desired value $U_s$ and the motor has a speed corresponding to the now lower frequency. The D.C. voltage regulator 3 thereupon resumes normal modulation operation. Since the brake switching elements Es7 and Es8 are not effective beyond the braking period, the brake resistor R has no influence during normal operation or during the transition period occurring upon an enlargement of the desired value $U_s$. The last-mentioned transition period can therefore be kept small by conventional means, for example by controlling the D.C. voltage regulator 3 in dependence on a limiting current.

Figure 2:
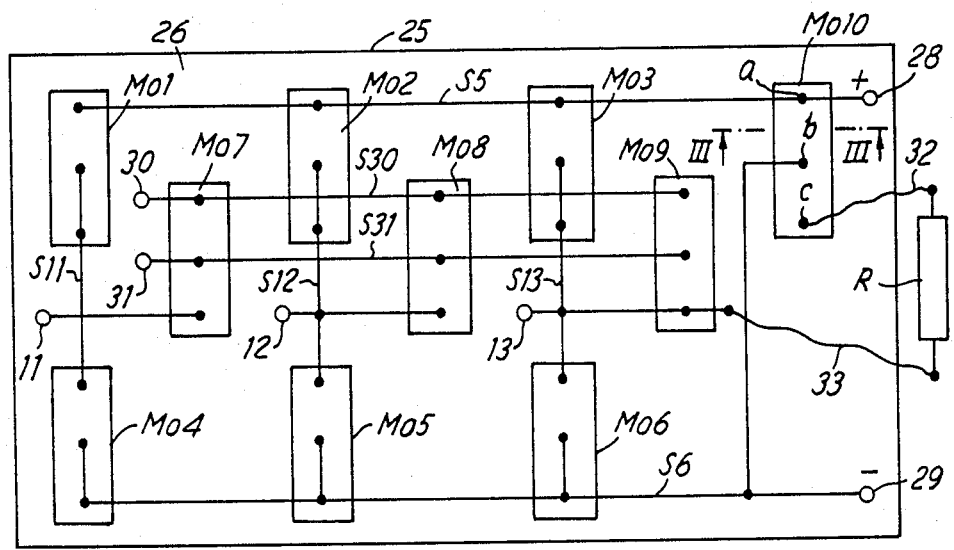
FIG. 2 is a plan view of a mounting plate with the switching elements of the arrangement according to the invention.
Figure 3:
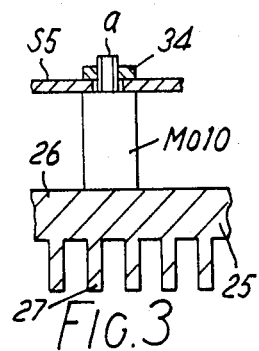
FIG. 3 is a section on the line III—III in FIG. 2.
Figure 4:
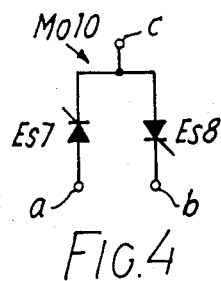
FIG. 4 is the circuit diagram of the block comprising the brake switching element.

FIGS. 2 to 4 illustrate a practical embodiment in which all switching elements and recovery diodes are mounted on a cooling plate 25 having a mounting surface 26 at the front and vertically extending cooling ribs 27 at the back. Blocks Mo1 to Mo10 are shown on the mounting surface 26, each having two semi-conductor switching elements. The connections are as illustrated for the block Mo10 in FIG. 4. The connections a and b are at the ends of the series circuit of the two switching elements. The connection therebetween is designated c. Similarly, the blocks contain the following switching elements:

Mo1: Es1 and D1
Mo2: Es3 and D3
Mo3: Es5 and D5
Mo4: Es2 and D2

Mo5: Es4 and D4

Mo6: Es6 an D6

Mo7: Two extinguishing switching elements for Es1 and Es2

Mo8: Two extinguishing switching elements for Es3 and Es4

Mo9: Two extinguishing switching elements for Es5 and Es6

Mo10: Es7 and Es8.

All connections a of the blocks Mo1, Mo2, Mo3 and Mo10 are connected by means of a rail S5 corresponding to the supply line 5. This rail also has a connection 28 for the positive D.C. voltage. The connections b and c of blocks Mo4, Mo5 and Mo6 as well as the connection b of block Mo10 are interconnected by a rail S6 which corresponds to the supply line 6 and has a connection 29 for the negative D.C. voltage. The phase connection 11, the connections b and c of block Mo1, the connection a of block Mo4 and the connection c of the block Mo7 are interconnected by a rail S11. Similarly, rails S12 and S13 are provided to form the phase connections 12 and 13. The connections a of block Mo7 to Mo9 are connected to a connection 30 for a first extinguishing circuit by way of a rail S30. The connections b of the said blocks are connected to a connection 31 for a second extinguishing circuit by way of a rail S31. The brake resistor R mounted beyond the plate 25 is connected by way of a line 32 to the connections c of block Mo10 and by way of a line 33 to the rail S13. FIG. 3 shows in cross-section that the connections are in the form of screw-threaded studs and the rail, in this case S5, can be connected to the block by means of a nut 34.

The additional components, i.e. the block Mo10 and the brake resistor R, can therefore be incorporated in the overall circuit at very little expense. The rails S5 and S6 need merely be lengthened accordingly and two lines 32 and 33 have to be provided. The control circuit is also very simple because the control signals for the brake switching elements can for the most part be derived from the control programme for the associated load switching elements Es5 and Es6 and because no additional extinguishing switching element is necessary for extinguishing purposes. If, for example, the load switching element Es5 is extinguished, a current will for a short time flow through the recovery diode D6 by reason of the motor inductance. The voltage drop at this recovery diode produces the counter-voltage required to extinguish the brake switching element Es8. Analogous considerations apply to extinguishing the brake switching element Es7 when extinguishing the load switching element Es6.

I claim:

1. A circuit for controllably driving an A.C. motor, comprising, a regulatable D.C. voltage supply having a pulse modulation regulator, a smoothing circuit forming two supply lines following said regulator, means operating said regulator to maintain a desired voltage between said supply lines, an inverse rectifier having for each phase thereof a pair of controllable load switching elements in series between said supply lines, each of said load switching elements being bridged by a recovery diode, a motor phase connection between said elements of each said pair of elements, a braking circuit including two series connected brake switching elements between said supply lines, a brake resistor between the junction of said brake switching elements and one of said motor phase connections, and switching means responsive to the voltage between said intermediate circuit supply lines to control the frequency of said inverse rectifier and said braking circuit.

2. A circuit according to claim 1 including a mounting unit having supply and return rails forming said supply lines and a motor phase rail forming said motor phase connection, a plurality of mounting blocks connected to said mounting unit including a separate mounting block for each of said load switching elements and an associated one of said recovery diodes, said supply rail connecting the input sides of half of said load switching elements and said return rail connecting the output sides of the other half of said load switching elements, said motor phase rail connecting the junctions of all of said load switching elements, a separate mounting block for said two brake switching elements with the input side of one of said brake switching elements being connected to said supply rail and the output side of the other of said brake switching element being connected to said return rail.

3. A circuit according to claim 1 wherein said switching means triggers said brake switching elements respectively substantially simultaneously with said load switching elements of said pair of load switching elements associated with said brake switching elements through said resistor.

4. A circuit according to claim 1 wherein said switching means triggers said brake switching elements respectively slightly after triggering said load switching elements of said pair of load switching elements associated with said brake switching elements through said resistor.

5. A circuit according to claim 1 wherein said switching means generates control signals for brake switching elements which are trigger signals which are maintained for the entire desired periods of the conductive state.

6. A circuit according to claim 1 including extinguishing circuit means comprising extinguishing switching elements for separately extinguishing only said load switching elements.

7. A circuit according to claim 1 including a brake signal generator which responds when said D.C. voltage regulator switches from pulse modulation operation to blocking operation.

* * * * *